S. W. HUNTINGTON.

Improvement in Scissors.

Figure 1:
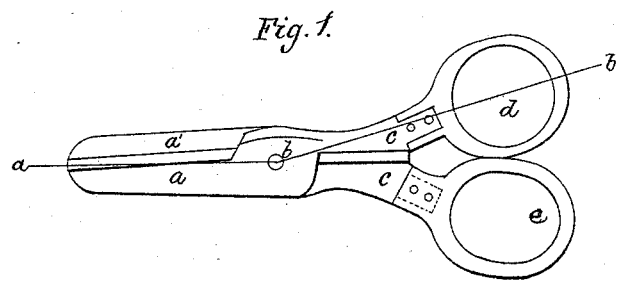

No. 131,273.	Patented Sep. 10, 1872.

on line a.b. of Fig. 1.

UNITED STATES PATENT OFFICE.

SAMUEL W. HUNTINGTON, OF AUGUSTA, MAINE.

IMPROVEMENT IN SCISSORS.

Specification forming part of Letters Patent No. 131,273, dated September 10, 1872.

Specification describing certain Improvements in Shears or Scissors, invented by SAMUEL W. HUNTINGTON, of Augusta, in the county of Kennebec and State of Maine.

This invention has especial reference to a class of shears or scissors shown in Letters Patent of the United States numbered 79,658, and issued to me on the 7th day of July, 1868, the characteristic feature in which is the addition of an auxiliary pair of blades in rear of the pivot of the primary blades for the purpose of cutting wire or hard substances. The purpose of this improvement is to devise a cheap manufacture of shears or scissors of this class by punching the blades from sheet-steel, in a suitable press, and casting or molding the thumb and finger rest or handle in an independent piece, which is soldered, brazed, or riveted to the blades.

Figure 2:
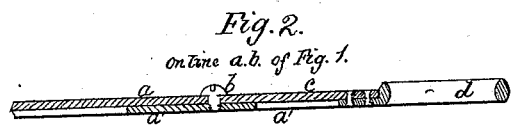

The drawing accompanying this specification represents, in Figure 1, an elevation, and in Fig. 2 a section, of a pair of scissors embodying my improvement.

In this drawing, $a$ $a'$ represent the blades of a pair of scissors, these blades being punched or fashioned from sheet-steel in a very expeditious and economical manner. $b$ represents the pivot of the blades $a$ $a'$, and $c$ the shank of each. Intervening between such pivot and the thumb and finger rests $d$ and $e$, the inner edge of each shank being formed into a blade or cutter for the purpose of cutting wire or other hard substances which would tend to injure the primary blades or unfit them for the purpose of cutting delicate substances.

In carrying out my present improvement I cast or mold the thumb and finger rests $d$ and $e$ independent of the blades $a$ $a'$, for the reason that, being thicker than such blades, they cannot be punched or cut from the same piece of sheet-steel. The joint between the thumb or finger rest and its blade may be made in any suitable manner, either by soldering or brazing, or by screws or rivets, and the joint itself may be made in different ways, either by rabbeting and lapping the parts, or by a dowel and socket, as shown in the accompanying drawing. I am compelled to make the joint between the blade and its eye or handle at the extreme end of its shank, in order to avoid injury to the auxiliary blades. The thumb and finger rest may be molded from Britannia-ware, or white metal, if preferred, in order to secure cheapness and prevent corrosion, or they may be of malleable-iron, if considerable strength is required, and plated with nickel or silver to impart an ornamental appearance.

By the mode of construction of shears or scissors above described I obtain great economy in manufacture, as I avoid the expensive labor of forging the blades and handles and obtain a result equally good.

What I claim, and desire to secure by Letters Patent, is—

Shears or scissors, consisting of blades $a$ $a'$ pivoted together with their shanks in rear of the pivotal point, formed into auxiliary blades, for the purpose specified, and thumb and finger rests formed separately from the blades and attached to the shanks of the same back of the point where the auxiliary blades are formed, as herein shown and described.

S. W. HUNTINGTON.

Witnesses:
F. CURTIS,
W. E. BOARDMAN.